INVENTORS
John W. Battin,
Jack Germain
BY
Mueller & Aichele
Attys

INVENTORS
John W. Battin
Jack Germain
BY
Mueller & Aichele
Attys.

3,284,714

NOISE REDUCING SYSTEM

John W. Battin, Naperville, and Jack Germain, Chicago, Ill., assignors to Motorola, Inc., Chicago, Ill., a corporation of Illinois Filed Mar. 12, 1963, Ser. No. 264,546
7 Claims. (Cl. 325—478)

Figure 1:
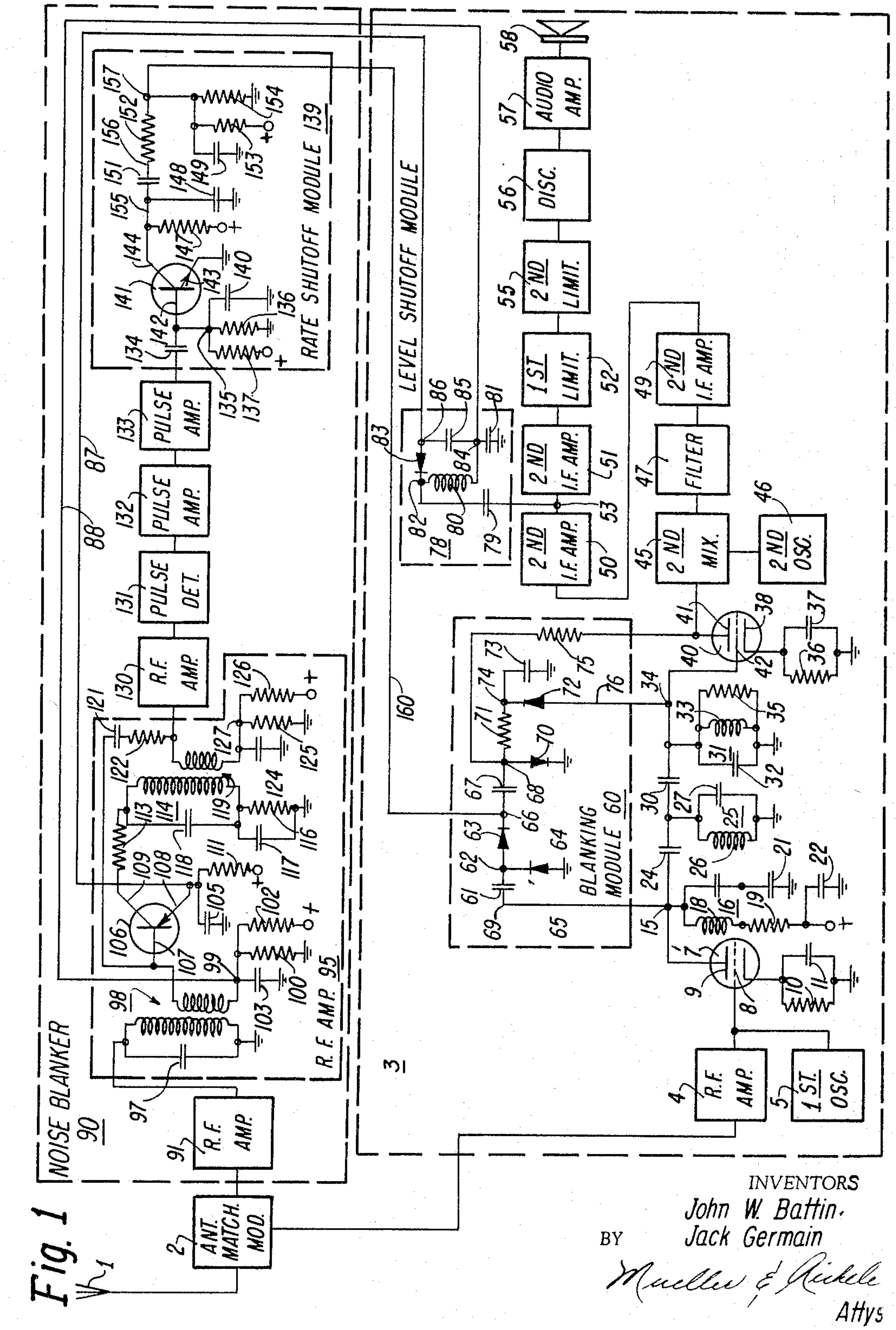

This invention relates to noise blanking circuits in general, and more particularly to an improved impulse noise blanking circuit for use in radio communication receivers.

It is well known that impulse noise disturbances which are superimposed on a carrier wave signal can seriously impair the translation of the desired signal within a radio receiver. The problem may be particularly critical in mobile communications equipment, where impulse noise energy from ignition systems, high voltage leakage, lightning flashes and the like is coupled to a highly sensitive receiver and appears as undesirable audio output. It may be further aggravated if the receiver is operating in a fringe area where the level of strength of the desired carrier wave is relatively weak.

Many types of devices are known for minimizing or eliminating such noise disturbances. Such devices are described and claimed in Patents Nos. 2,901,601 and 3,014,127, both assigned to Motorola, Inc., the assignee of the present application. These systems detect noise pulses in an early stage of the receiver and removed the effects of the noise pulses by interrupting the signal conduction at a point preceding the relatively high selectivity portion of the receiver. The system of the present invention is an improvement over devices of this type and overcomes certain problems which have arisen in prior systems.

One such problem occurs when two strong signals entering the radio frequency amplifier section of the noise blanker mix and produce intercarrier "beat" notes which will be interpreted as noise pulses by the noise blanker. If the beat note frequency is high enough and persists for an appreciable time, degradation in receiver performance would occur since each of these beat notes would produce a pulse which would turn the receiver off. The beat notes may occur at a rate so rapid that the blanking pulses will overlap and no information is allowed to pass through the receiver.

Another problem occurs when a receiver is turned off by a blanking pulse for too long a period of time. When the receiver is turned off for a short period of time the "hole" developed in the signal is normally filled in with stored energy in the following sections of the receiver, such as the filter, and is not noticeable in the audio output. However, there is a limited amount of energy stored in the subsequent stages of the receiver and if the blanking persist for too long a period of time this stored energy is exhausted and the "hole" is filled in with noise generated in the subsequent receiver stages. The noise impulses which are to be eliminated from the output signal occur in random bursts of pulses and the individual pulses within each burst have various amplitude levels. Each of the individual noise pulses will develop a blanking pulse to turn off the receiver. Thus if the pulses occur at a very rapid rate the receiver may be continuously turned off long enough for the stored energy in the subsequent receiver stages to be exhausted and the noise developed in the subsequent receiver stages will appear in the audio output.

When the input signal to the receiver is weak, substantially all of the noise pulses present will cause degradation in the output signal. As the input signal to the receiver increases, the signal will overcome the weaker noise pulses so that these weak pulses do not degrade the receiver performance. If the signal strength to the receiver reaches a high level none of the noise pulses normally present will cause receiver output degradation.

The bursts of noise impulses which occur at a high enough pulse repetition rate to exhaust the stored energy in the receiver occur at random intervals. When the signal level is weak it is desirable to blank the receiver whenever a noise impulse is present even though this will result in some periods where the receiver stored energy will be exhausted and receiver generated noise will appear in the audio output, as these periods will be far fewer than the periods during which the stored energy will be adequate to fill the holes resulting from the blanking action. However, when the signal strength increases many of the random bursts of pulses which have a duration and pulse repetition rate sufficient to exhaust the stored energy of the receiver if they were allowed to blank the receiver, do not contain pulses of sufficient amplitude to cause degradation in the receiver output if the receiver is not blanked. It is therefore desirable, when a strong carrier signal is being received, to limit the blanking action to those noise pulses present which are above a minimum amplitude relative to the desired carrier.

It is therefore an object of this invention to provide a noise blanker for a radio receiver which has a minimum effect upon the signal translation performance of the receiver in the presence of disturbances which occur at high frequency, such as beat notes produced by mixing of strong carrier waves.

Another object is to provide a noise blanker for a radio receiver which does not have a degrading effect upon the signal translation performance of the receiver when receiving strong signals.

A feature of the invention is the provision of a noise blanker which includes a rate shut off circuit for gradually reducing in amplitude and width the blanking pulses applied to the receiver when the blanking pulses exceed a given repetition rate for a given length of time.

Still another feature is the provision of a noise blanker which includes a level shut off circuit for decreasing the threshold sensitivity of the noise blanker to impulse noise, as the carrier wave signal level at the input to the receiver increases.

This invention is illustrated in the drawings wherein

Figure 2:
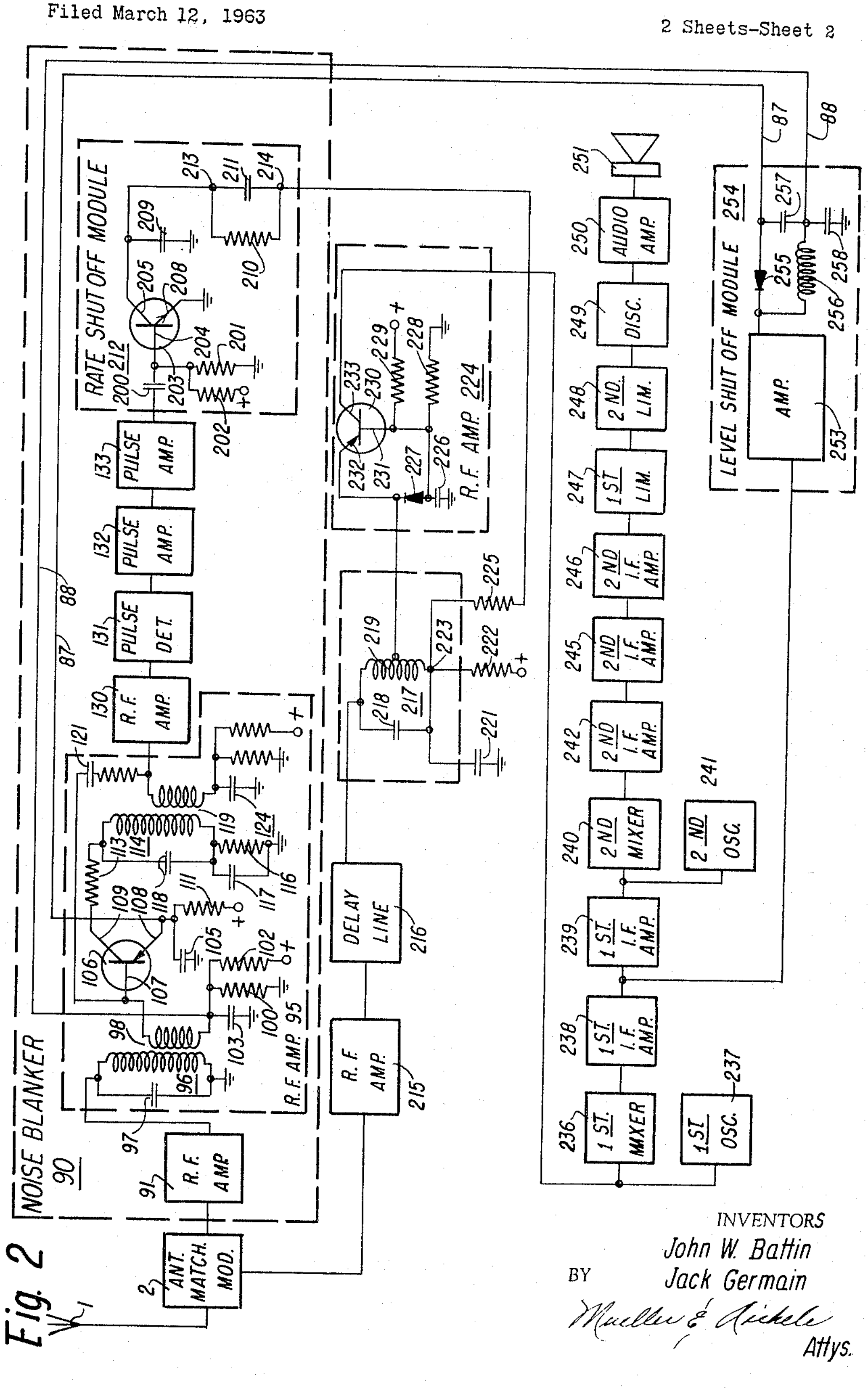

FIG. 1 is a partial schematic and partial block diagram of a radio receiver including a blanking system incorporating rate and level shut off; and FIG. 2 is a partial schematic and partial block diagram of another embodiment of a noise blanking system incorporating rate and level shut off.

In practicing the invention a radio communication receiver is provided with a noise blanker operative to detect noise disturbances. Signals are applied directly from the receiver antenna circuit to a radio frequency amplifier of the noise blanker, the threshold sensitivity of which can be decreased upon the application of a potential thereto. The output of the amplifier is detected in a pulse detector and the resulting pulses are amplified and utilized to disable stages of the receiver for the duration of the applied pulse. A rate shut off circuit may be inserted in the noise blanker system to reduce the amplitude and width of the blanking pulses applied to the receiver when the blanking pulse repetition rate is higher than a predetermined rate for longer than a predetermined time. In addition, the output of a subsequent intermediate frequency stage of the receiver may be detected and this potential applied to a radio frequency stage of the noise blanker in order to decrease the threshold sensitivity of that radio frequency stage. This forms a level shut off which prevents the noise blanker from generating blanking pulses whenever the noise pulses are low as related to the carrier amplitude.

In FIG. 1, there is illustrated a frequency modulation communication receiver 3 of the double superheterodyne type, and a noise blanker 90 conupled to the receiver. It is to be understood, however, that the invention is not limited to use in any particular type of receiver.

An antenna matching module 2 connects the antenna 1 to the radio frequency (RF) amplifier 4 of the receiver 3, and to the RF amplifier 91 of the noise blanker 90. The output of RF amplifier 4 and the first oscillator 5 are mixed and applied to the grid 8 of the first mixer tube 7. Resistor 10 provides a bias voltage for mixer tube 7 and capacitor 11 provides a bypass path about resistor 10. The output of the first mixer tube 7 is coupled from plate 9 to the grid 42 of the first intermediate frequency (IF) amplifier 40 by means of tuned circuits 16, 25, 31 and coupling capacitors 24 and 30. Resistor 36 furnishes a bias for IF amplifier 40 and capacitor 37 provides a bypass path for resistor 36. Plate 41 of IF amplifier 40 is coupled to the second mixer 45 where the IF signal is mixed with an input signal from second oscillator 46 to form a second IF signal. This second IF signal is filtered in filter 47 and amplified in second IF amplifiers 49, 50 and 51. The output of second intermediate frequency amplifier 51 is connected to first limiter 52, and from the first limiter to the second limiter 55, discriminator 56, and audio portion 57 of the receiver.

The output of RF amplifier 91 is connected to RF amplifier 95 through the tuned transformer 98. The secondary of transformer 98 is connected to the base 107 of transistor 106. Bias voltage for the base is furnished by resistors 100 and 102, connected between a positive voltage and ground. Capacitor 103 furnishes a low impedance path to ground, for alternating current signals. Bias resistor 111 is placed in the emitter circuit of transistor 106. Capacitor 105 provides a bypass across resistor 111 to prevent degeneration. Collector 109 of transistor 106 is connected to ground through resistor 113, tuned circuit 114, and resistor 116. The output of amplifier 95 is taken from transformer 119 the secondary of which is connected to the input of radio frequency amplifier 130. Resistor 122 and capacitor 121 furnish a feedback path from the input of radio frequency amplifier 130 to the input of radio frequency amplifier 95. Bias voltage for the base of radio frequency amplifier 130 is furnished by resistors 125 and 126 connected between a positive voltage and ground. Capacitor 124 furnishes a low impedance path to ground for alternating current signals from one side of the secondary of transformer 119.

Pulse detector 131 receives the output of RF amplifier 130 and detects any pulses present above a predetermined threshold level. These pulses are amplified in pulse amplifiers 132, 133, and 139. The output of pulse amplifier 133 is connected to the base 142 of transistor 141 through capacitor 134. A bias voltage for the base is provided by resistors 136 and 137 connected between a positive potential and ground. Capacitor 140 is an R.F. signal bypass to ground. Resistor 147 is the load resistor for transistor 141 and is connected between collector 144 and a positive potential. Emitter 143 is connected to ground. The output signal of transistor 141 is connected through capacitor 151, resistor 152, and conductor 160 to the blanking module 60. A bias voltage for the diodes in the blanking module is furnished by resistors 153 and 154 connected between the positive potential and ground. Capacitors 148 and 149 and resistor 152 shape the blanking pulse for optimum blanking action.

The input conductor 160 to the noise blanking module 60 is connected to common point 66. Diode 63 is connected between point 66 and point 62, and diode 64 is connected between point 62 and ground. Capacitor 61 is connected between point 62 and point 15, which is connected to one side of the tuned circuit 16. Capacitor 67 is connected between point 66 and point 68. Diode 70 is connected between point 68 and ground, and resistor 71 is connected between point 68 and point 74. Diode 72 is connected through conductor 76 to point 34 which is connected to one side of tuned circuit 31. Capacitor 73 is connected between point 74 and ground, and resistor 75 is connected between point 68 and the plate 41 of IF amplifier 40.

Level shut off module 78 is connected to the output of second IF amplifier 50 through capacitor 79. Capacitor 79 is connected to diode 83 and to terminal 82 of choke 80. Capacitor 81 is connected between terminal 84 and ground. Capacitor 85 is connected from point 86 to terminal 84 of choke 80. The anode of diode 83 is connected to capacitor 85 and the cathode of diode 83 is connected to terminal 82 of choke 80. Two output conductors 87 and 88 are connected between the level shut off module and the RF amplifier 95 of the noise blanker 90. Conductor 87 is connected to the emitter 108 of transistor 106. Connector 88 is connected to point 99 of transformer 98.

In operation, the receiver is tuned to the desired signal and RF amplifier 91 of the noise blanking circuit 90 is tuned to a nearby but usually different frequency. The impulse noise bursts which would interfere with the desired signal will also appear at the frequency to which the noise blanker is tuned. These noise bursts are amplified in the RF amplifier stages 91, 95, and 130 of the noise blanking circuit and detected in the pulse detector 131. The pulses detected in detector 131 are amplified in pulse amplifiers 132, 133, and 139. In normal operation these pulses are properly shaped by the output circuitry of pulse amplifier stage 139, and applied by conductor 160 to the blanking module 60 connected to the first IF stage of the receiver.

The desired signal is amplified by RF amplifier 4 and mixed with the output of first oscillator 5 in the first mixer 7. The output of mixer 7 is applied to the grid 42 of IF amplifier 40 through tuned circuits 16, 25 and 31 and capacitors 24 and 30. The output of this amplifier is coupled to second mixer 45 where it is further detected and amplified.

The output of first mixer 7 appears across coil 18 of tuned circuit 16. The coil is connected to ground through capacitors 21 and 61 and diode 64. With no blanking pulse present, point 66 is biased at a positive potential by resistors 153 and 154, connected between a positive potential and ground. When point 66 has a positive potential with respect to ground, diodes 63 and 64 are biased so they are non-conducting, thereby preventing the signal appearing at point 15 from being bypassed to ground. When a noise pulse has been detected by the noise blanker, a negative potential is developed and applied to conductor 160, in a manner to be described subsequently, so that point 66 becomes negative with respect to ground. Diodes 63 and 64 are then biased in the forward direction so that capacitor 61 is connected to ground and effectively bypasses the signal appearing across coil 18.

In addition to bypassing the signal at the output of the first mixer, there is further blanking at the input tuned circuit of IF amplifier 40. Grid 42 of IF amplifier 40 is held near ground potential through tuned circuit 31. Cathode 38 of the amplifier 40 is at a positive potential because of the bias resistor 36. Grid 42 is thus at a negative potential with respect to the cathode. Point 68 is held at a very small positive potential by means of diode 70 and by resistor 75. This small positive potential biases diode 72 through resistor 71 so that it is non-conducting. When a negative pulse appears at point 66, it is coupled to diode 72 through capacitor 67 and resistor 71, biasing diode 72 so that it will conduct. The coil 33 of tuned circuit 31 is thus bypassed, through capacitor 73, so that no signal can be developed across coil 33.

With no impulse noise present, transistor 141 is biased by resistors 136 and 137 so that it is non-conducting. The positive supply voltage is applied through resistor 147 to capacitor 151 and to the collector 144 of transistor 141. A less positive voltage is applied to the other side of capacitor 151 through resistor 152 from the midpoint of voltage divider 153, 154. Since transistor 141 is non-conducting capacitor 151 will charge until the voltage across it is equal to the voltage drop across resistor 153.

Upon the detection of impulse noise by the noise blanker, positive pulses appear at the output of pulse amplifier 133 and are coupled to transistor 141 through capacitor 134. When a positive pulse is applied to transistor 141, the base emitter junction of the transistor is biased in the forward direction turning on the transistor. Point 155 is now connected to ground through the turned on transistor 141, and the potential at point 155 rapidly falls to a value near ground potential. Since the voltage across capacitor 151 cannot change instantaneously, point 156 follows point 155 in the negative direction. Point 156 is negative with respect to point 155, so that when point 155 reaches a value near ground potential, point 156 will be negative by an amount equal to the voltage difference between them. Capacitor 151 begins to discharge through transistor 141 and resistors 153, 154, and 152 and if point 155 is held at ground potential long enough, point 156 will change to a positive voltage equal to the voltage at point 157 before the pulse was received by transistor 141. In this case point 156 will be positive with respect to point 155. In actual operation, however, the pulses generated in the noise blanking circuit are very short compared with the time constants of the charge and discharge paths of capacitor 151, therefore there will be time for point 156 to become only slightly less negative with respect to point 155 before the pulse ceases and transistor 141 is cut off. With transistor 141 cut off the voltages at points 155 and 156 rise to values very close to their value before the positive pulse turned on transistor 141. Capacitor 151 then charges to its original value through resistors 147, 152, 153 and 154.

The negative pulses thus generated are shaped by capacitors 148 and 149 and resistor 152 and applied through conductor 160 to the noise blanking module of the receiver 60 where they operate, as previously described, to disable the receiver.

The time constants of the charge and discharge paths of capacitor 151 are so large with respect to the duration of the pulses applied that the charge on capacitor 151 will not have time to change appreciably during each pulse. However, if a train of pulses of a sufficiently high repetition rate occur for a sufficiently long period of time, the voltage across capacitor 151 will decrease to zero, reverse polarity, and then increase. As the voltage across capacitor 151 changes a point will be reached where, as point 155 is connected to ground through transistor 141, point 156 will no longer be negative, but will be zero or positive depending upon the pulse repetition rate and its duration. Thus the negative going pulse which is applied to the blanking module 60, does not reach a negative potential with respect to ground and diodes 63 and 64 are not biased in the forward direction. These diodes therefore do not furnish a low impedance path to ground from point 15 through capacitor 61. In addition diode 72 is not biased so as to bypass coil 33. The blanking pulses generated by the noise blanker 90 are therefore not permitted to disable the receiver by blanking the receiver at a rate such that the blanked out intervals overlap and no information is permitted to pass through the receiver. For the pulse repetition rates lower than the level at which the blanking pulses are cut off capacitor 151 still retains a charge which is inversely proportional to the pulse repetition rate. This reduction in charge of capacitor 151, as the pulse repetition rate increases, causes a gradual reduction in the amplitude and blanking time of the blanking pulses applied to the receiver.

This is advantageous because intercarrier beat notes that would normally generate just overlapping blanking pulses, now no longer lock up the receiver. The reduction in blanking time and amplitude thus permits receiver output while at the same time permits some noise blanking so that this output signal enjoys an improved signal to noise ratio.

A portion of the output of IF amplifier 50, is coupled to the level shut off module 78 through coupling capacitor 79. Capacitor 79 is connected to choke 80 at point 82. The alternating voltage developed across the choke 80 is rectified by diode 83 and filtered by capacitor 85 and appears across points 86 and 84 of the level shut off module as a D.C. voltage with point 86 being negative with respect to point 84. This potential difference is applied to transistor 106 through conductors 87 and 88, with the positive potential being applied to point 99 and the negative potential being applied to the emitter 108 of transistor 106.

As the signal strength to the receiver increases, the signal at the output of the second intermediate frequency amplifier 50 increases causing the rectified output of level shut off module 78 to increase. This rectified voltage is applied across the base to emitter junction of transistor 106 in such a polarity as to gradually bias this transistor so that only the noise pulses above a certain threshold level can cause current to flow in transistor 106. As the signal strength of the output of the second IF amplifier 50 increases the threshold level is raised until a point is reached at which no noise pulses can cause transistor 106 to conduct and thus no blanking pulses are generated. Thus, as the carrier amplitude increases, only the large impulse noise disturbances create blanking pulses until the carrier amplitude is such that there are no impulse disturbances which are sufficiently large to develop a blanking pulse and the blanker is biased off completely.

FIGURE 2 shows another embodiment of this invention in which the blanking is accomplished in the RF portion of the receiver. The noise blanker 90 in FIG. 2 is similar to the noise blanker 90 shown in FIG. 1 and similar components have the same numbers. The rate shut off portion of the noise blanker shown in FIG. 2 differs from that shown in FIG. 1 and its action will be described subsequently.

The receiver is tuned to the desired signal which is amplified in RF amplifier 215 and coupled to RF amplifier 224 through delay line 216. The blanking pulses are applied to the emitter 232 of transistor 230 through coil 219. The output of transistor 230 is coupled to first mixer 236 together with the output of first oscillator 237. The resulting intermediate frequency signal is further amplified in first IF amplifiers 238 and 239 and mixed with the output of second oscillator 241 in the second mixer 240. The output of the second mixer 240 is amplified in the second IF stages 242, 245, and 246 and further amplified in the first and second limiter stages 247 and 248. The audio information is recovered in the discriminator 249 and amplified in audio amplifier 250. The amplified audio signal is coupled to a loud speaker or earphones.

The delay line 216 delays the desired signal for a period equal to the delay encountered by the noise pulse, as it is detected and amplified in noise blanker 90, so that the resulting blanking pulse is applied to the emitter 232 of transistor 230 at the correct time to bias off this stage when the noise pulse is present.

The bias for the base 231 of transistor 230 is furnished by resistors 229 and 228 connected between a positive potential and ground. Capacitor 226 furnishes an RF bypass from the base 231 to ground. Bias voltage for the emitter 232 of transistor 230 is furnished by resistor 222 connected between the positive potential and coil 219. Tank circuit 217, comprised of capacitor 218 and coil 219, is the final tank circuit of the delay line. One end of this tank circuit is bypassed to ground through capacitor 221. Diode 227 prevents the emitter to base voltage appearing at transistor 230 from exceeding its emitter to base breakdown voltage.

Blanking pulses from pulse amplifier 133 are coupled to the base 204 of transistor 203 through capacitor 200. The base 204 is normally biased by resistors 201 and 202, connected between a positive potential supply and ground, so that transistor 203 is non-conducting. The pulses from pulse amplifier 133 bias transistor 203 so that it is conducting.

With no noise pulses present transistor 203 is cut off and the D.C. voltage appearing at the emiter 232 of transistor 230 also appears at points 213 and 214 which are connected to capacitor 211. When transistor 203 is biased by a pulse applied to its base, so that it is conducting, the potential at point 213 assumes a potential close to zero. Since the potential across capacitor 211 cannot change instantaneously point 214 also assumes a potential substantially zero. With the voltage at point 214 substantially zero the voltage appearing at point 223 is determined by the voltage divider action of resistors 222 and 225. The values of these are chosen so that the potential at point 223, and thus at emitter 232, biases transistor 230 so that it is cut off. As capacitor 211 charges, through resistors 222 and 225, the voltage at point 214 rises, and thus the voltage appearing at the emitter 232 also rises, until a steady state condition is reached. The potential applied to the emitter 232 when this steady state condition is reached is determined by the voltage divider action of resistors 222, 225, and 210. The values of these resistors are chosen to bias transistor 230 so that it is conducting when this steady state condition is reached. Thus the voltage applied to the emitter of transistor 230, when transistor 203 is conducting is determined by the charge on capacitor 211.

When the pulse applied to transistor 203 is removed the voltage at point 214 rises to the voltage at point 223. However, since the voltage across capacitor 211 cannot change instantaneously the voltage at point 213 is lower than the voltage at point 214 by an amount determined by the charge accumulated on capacitor 211. This charge equalizes itself through resistor 210 reducing the voltage drop across capacitor 211 to zero. As subsequent pulses appear this process is repeated. In normal operation the pulses applied to transistor 203 are of such short duration compared to the charging time of capacitor 211 and of such a low pulse repetition rate that no appreciable charge will accumulate on this capacitor. However, if the pluse repetition rate reaches a high enough value the subsequent pulses will appear before the charge on capacitor 211 has had sufficient time to equalize itself. As subsequent pulses appear, to charge capacitor 211, this charge will build up to a level which is proportional to the pulse repetition rate. The charge on capacitor 211 reduces the drop in the bias voltage applied to the emitter of transistor 230. If the charge on capacitor 211 is sufficiently high the drop in voltage will not be enough to bias off transistor 230. It should be noted that many pulses are required to build up the charge on capacitor 211 to the point where transistor 230 will not be cut off by the pulses from the noise blanker. A burst of pulses, even if their rate is extremely high, will not charge capacitor 211 to the point where the blanking pulses applied to transistor 230 will be affected. Thus the pulse repetition rate must reach a predetermined value for a minimum length of time before the rate cut off circuit will operate to reduce or cut off the blanking pulses such as is produced by pulses generated by intercarrier beat notes.

A portion of the output of IF amplifier 238 is coupled to the amplifier 253 in the level shut off module 254. The output of amplifier 253 is connected to a rectifying circuit comprised of diode 255, coil 256 and capacitors 257 and 258. The alternating voltage developed across coil 256 is rectified by diode 255 and filtered by capacitor 257. The potential difference thus developed is coupled to the RF amplifier 95 of the noise blanker 90 through conductors 87 and 88 with conductor 88 being positive with respect to conductor 87. This bias potential operates on RF amplifier 95 in the manner previously described in the description of the embodiment shown in FIGURE 1.

It is not necessary for the practice of this invention that the features be combined into one system at all times. The rate shut off or the level shut off can be used alone or in combination with each other and together with other types of blanking than that illustrated.

The invention provides, therefore, an improved impulse noise blanker which reduces and prevents application of the blanking pulses to the receiver when the blanking pulses occur at a very rapid rate for a predetermined minimum time and/or when the signal strength of the desired signal is high with respect to pulse amplitude.

We claim:

1. A noise blanking system for use in a carrier wave receiver which includes a first portion in which may appear a modulated carrier wave accompanied by noise pulses and a second portion coupled to said first portion for translating the modulated carrier wave and in which the second portion is adapted to be interruped by the application of blanking pulses thereto, said noise blanking system including in combination; signal level detection means connected to the second portion of the receiver to provide a potential proportional to the signal level in the second portion, means for generating blanking pulses having a first amplitude in response to impulse noise greater than a predetermined threshold level applied thereto, first circuit means connecting said signal level detection means to said pulse generating means for applying said potential to said pulse generating means to increase said threshold level in proportion to the increase in said potential, second circuit means connecting said blanking pulse generating means to the second portion of the receiver for applying said blanking pulses thereto to interrupt the second portion, said second circuit means including rate shut off means for reducing the amplitude of said blanking pulses from said first amplitude to a second amplitude when said blanking pulses exceed a predetermined pulse repetition rate for a predetermined time.

2. In a carrier wave receiver which includes an antenna, a first receiver portion coupled to the antenna, and a second receiver portion coupled to said first portion for translating a desired signal which may be accompanied by impulse noise disturbances and which is adapted to be interrupted by the application of blanking pulses thereto, a noise blanking system including in combination; signal level detection means connected to the second portion of the receiver to provide a potential proportional to the signal level in the second portion, means for generating blanking pulses having a first amplitude in response to impulse noise applied thereto, said generating means including a radio frequency amplifier adapted to amplify said noise impulses greater than a predetermined threshold level, first circuit means connecting said signal level detection means to said amplifier for applying said potential to said amplifier to increase said threshold level in proportion to the increase in said potential, second circuit means connecting said blanking pulse generating means to the second portion of the receiver for applying said blanking pulses thereto interrupt the second portion, said second circuit means including rate shut off means for reducing the amplitude of said blanking pulses from said first amplitude to a second amplitude when said blanking pulses exceed a predetermined pulse repetition rate for a predetermined time.

3. A noise blanking system for use in a carrier wave receiver which includes, an antenna, a first receiver portion coupled to the antenna, and in which may appear a modulated carrier wave accompanied by noise pulses, and a second receiver portion coupled to said first portion for translating the modulating carrier wave and in which the second portion is adapted to be interrupted by the application of a control potential thereto, said noise blanking system including in combination; signal level detection means to provide a bias potential proportional to the signal level in the second portion and including rectifier means for producing said bias potential in response to an alternating current signal applied thereto, coupling means connecting said rectifying means to the second portion of the receiver, said coupling means coupling a portion of said alternating current signals to said rectifying means, means for the generation of blanking pulses having a first amplitude in response to impulse noise greater than a predetermined threshold level applied thereto, first circuit means connecting said rectifier means to said pulse generating means for applying said bias potential thereto to increase said threshold level in proportion to the increase in said bias potential, second circuit means for the generation of said control potential including switch means, capacitor means, first charging path means, second charging path means, and control potential output means, said switch means being connected to said pulse generation means and to said capacitor means and being responsive to said pulses to connect said first charging path means to said capacitor means when a pulse is present and to connection said second charging path means to said capacitor means when no pulse is present, said control potential output means being connected to said capacitor means and to the second receiver portion and being responsive to said capacitor means to produce said control potential when said switch means connects said capacitor means to said first charging path means, said control potential varying with the charge on said capacitor means, said first charging path operating on said capacitor means to change the charge thereon, said second charging path operating on said capacitor means to restore the charge thereon, so as the pulse repetition rate of said pulses increases beyond a predetermined rate for a predetermined length of time the amplitude of said control potential is reduced from said first amplitude to a second amplitude.

4. A noise blanking system for use in a carrier wave receiver which includes, an antenna, a first receiver portion coupled to the antenna, and in which may appear a modulated carrier wave accompanied by noise pulses, and a second receiver portion coupled to said first portion for translating the modulated carrier wave and in which the second portion is adapted to be interrupted by the application of a control potential thereto, said noise blanking system including in combination; signal level detection means to provide a bias potential proportional to the signal level in the second portion and including rectifier means for producing said bias potential in response to an alternating current signal applied thereto, coupling means connecting said rectifier means to the second portion of the receiver, said coupling means coupling a portion of said alternating current signals to said rectifier means, means for generating blanking pulses having a first amplitude in response to impulse noise applied thereto, said generating means including a radio frequency amplifier adapted to amplify said noise impulses greater than a predetermined threshold level, first circuit means connecting said rectifier means to said radio frequency amplifier for applying said bias potential to said radio frequency amplifier to increase said threshold level in proportion to the increase in said bias potential, second circuit means for the generation of said control potential including switch means, capacitor means, first charging path means, second charging path means, and control potential output means, said switch means being connected to said pulse generating means and to said capacitor means and being responsive to said pulses to connect said first charging path means to said capacitor means when a pulse is present and to connect said second charging path means to said capacitor means when no pulse is present, said control potential output means being connected to said capacitor means and to the second receiver portion and being responsive to said capacitor to produce said control potential when said switch means connects said capacitor means to said first charging path means, said control potential varying with the charge on said capacitor means, said first charging path operating on said capacitor means to change the charge thereon, said second charging path operating on said capacitor means to restore the charge thereon, so as the pulse repetition rate of said pulses increases beyond a predetermined rate for a predetermined length of time the amplitude of said control potential is reduced from said first amplitude to a second amplitude.

5. A noise blanking system for use in a carrier wave receiver which includes an antenna, an intermediate frequency amplifier stage for translating a desired signal which may be accompanied by impulse noise disturbances, and which is adapted to be interrupted by the application of a blanking pulse thereto, a radio frequency amplifier and converter stage connecting the antenna to the intermediate frequency amplifier stage, said noise blanking system including in combination; means for the generation of blanking pulses in response to impulse noise applied thereto coupled to the antenna, switch means coupled to said blanking pulse generation means for receiving said blanking pulses, first and second charging path means coupled to said switch means, capacitor means coupling said switch means to the intermediate frequency amplifier stage for applying said blanking pulses thereto, said switch means being responsive to said blanking pulses to connect said first charging path means to said capacitor means with a blanking pulse present and to connect said second charging path means to said capacitor means with no blanking pulse present, said first charging path means acting to change the charge on said capacitor means, said second charging path means acting to restore the charge on said capacitor means, said capacitor means acting to vary the amplitude of said blanking pulses in response to the magnitude of the charge thereon, whereby the amplitude of said blanking pulses is reduced in response to blanking pulses having a repetition rate which exceeds a predetermined rate for a predetermined length of time.

6. A noise blanking system for use in a carrier wave receiver which includes an antenna, an intermediate frequency amplifier stage for translating a desired signal which may be accompanied by impulse noise disturbances, a radio frequency amplifier and converter stage coupling the antenna to the intermediate frequency amplifier stage and which is adapted to be interrupted by the application of a blanking pulse thereto, said noise blanking system including in combination; means for the generation of blanking pulses in response to impulse noise applied thereto coupled to the antenna, switch means coupled to said blanking pulse generation means for receiving said blanking pulses, first and second charging path means coupled to said switch means, capacitor means coupling said switch means to the radio frequency amplifier and converter stage for applying said blanking pulses thereto, said switch means being responsive to said blanking pulses to connect said first charging path means to said capacitor means with a blanking pulse present and to connect said second charging path means to said capacitor means with no blanking pulse present, said first charging path means acting to change the charge on said capacitor means, said second charging path means acting to restore the charge on said capacitor means, said capacitor means acting to vary the amplitude of said blanking pulses in response to the magnitude of the charge thereon, whereby the amplitude of said blanking pulses is reduced in response to blanking pulses having a repetition rate which exceeds a predetermined rate for a predetermined length of time.

7. A noise blanking system for use in a carrier wave receiver which includes an antenna, a first receiver portion coupled to the antenna and in which may appear a modulated carrier wave accompanied by impulse noise of greater amplitude than the carrier wave, and a second receiver portion coupled to said first receiver portion for translating the modulated carrier wave, and in which the second portion is adapted to be interrupted by the application of a blanking pulse thereto, said noise blanking system including in combination; means for the generation of blanking pulses in response to impulse noise applied thereto coupled to the first receiver portion, switch means coupled to said blanking pulse generation means for receiving said blanking pulses, first and second charging path means coupled to said switch means, capacitor means coupling said switch means to the second receiver portion for applying said blanking pulses thereto, said switch means being responsive to said blanking pulses to connect said first charging path means to said capacitor means with a blanking pulse present and to connect said second charging path means to said capacitor means with no blanking pulse present, said first charging path means acting to change the charge on said capacitor means, said second charging path means acting to restore the charge on said capacitor means, said capacitor means acting to vary the amplitude of said blanking pulses in response to the magnitude of the charge thereon, whereby the amplitude of said blanking pulses is reduced in response to blanking pulses having a repetition rate which exceeds a predetermined rate for a predetermined length of time.

References Cited by the Examiner

UNITED STATES PATENTS 3,140,446 7/1964 Myers et al. ______ 325—324 X

KATHLEEN H. CLAFFY, *Primary Examiner.*

R. LINN, *Assistant Examiner.*